Nov. 27, 1934.　　　O. DRAPAL　　　1,982,468
ENDLESS TRACK FOR VEHICLES
Filed April 7, 1933　　　2 Sheets—Sheet 1

OTTOKAR DRAPAL
INVENTOR

Nov. 27, 1934.  O. DRAPAL  1,982,468
ENDLESS TRACK FOR VEHICLES
Filed April 7, 1933  2 Sheets-Sheet 2

OTTOKAR DRAPAL
INVENTOR his ATTY.

Patented Nov. 27, 1934

1,982,468

UNITED STATES PATENT OFFICE 1,982,468

ENDLESS TRACK FOR VEHICLES

Ottokar Drapal, Erla, near St. Valentin, Austria

Application April 7, 1933, Serial No. 664,861
In Austria April 13, 1932

3 Claims. (Cl. 305—10)

This invention relates to a new and improved endless track for vehicles of all kinds, and provides a track of this nature which is particularly suitable for use in connection with smaller vehicles such as wheelbarrows, and the like.

The endless link tracks for vehicles which have hitherto become known possess without exception the disadvantage that their manufacture is expensive, since the elements or links are of complicated shape and must therefore be manufactured from castings, since, further, in many cases two different types of link must be employed, and also since the links are not coupled together directly but with the interposition of intermediate elements. For all these reasons the cost of manufacture is apt to run high, and the tracks lose in strength and length of life.

The present invention provides an endless track in which these drawbacks are entirely obviated. The track according to the invention consists of links which are capable of being produced from a single plate-shaped piece of material, which are directly coupled together by means of knuckle pins, and which are provided on each side with a projecting bearing plate provided in its turn with a plate having bearing eyes adjoining the bearing plate at right angles, and extending towards the front and towards the back, and with a middle piece connecting these plates together and disposed opposite the bearing plate. Each of the links of the track can thus be made from a single piece of sheet steel, by stamping and bending, in a very simple manner, and so inexpensively that this type of track can very well be used in conjunction with small vehicles, such as wheelbarrows and the like.

Further features of the invention consist in the fact that of the links constituting the track, which are identical in shape, each second link is reversed end for end, that is to say turned through 180°, for insertion in the track, the articulation plates to be coupled together being thereby caused to overlap; and also in the fact that the one bearing plate of each link is larger than the other bearing plate by about the extent of the thickness of the articulation plate, when measured parallel to the axis of the wheel, a straight outer edge being thereby maintained in spite of lateral displacement of the plates in the track.

An example of a structural embodiment of the invention is shown in the accompanying drawings, in which.

Figure 1:
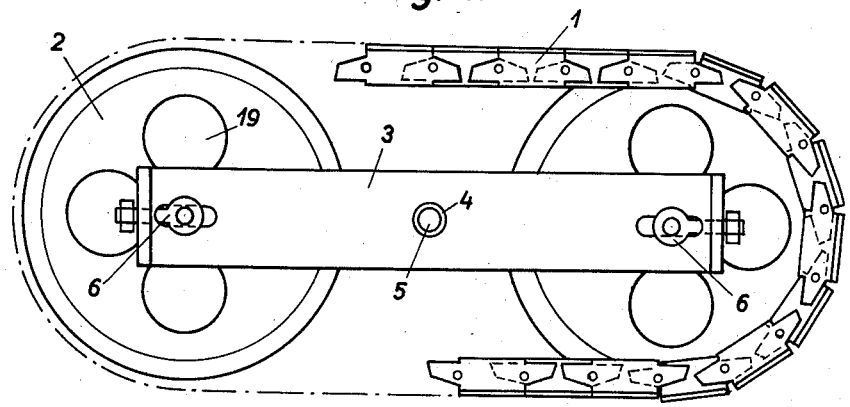
Fig. 1 is a side elevational view of the endless track and its supporting structure, a portion of the track being omitted.
Figure 2:
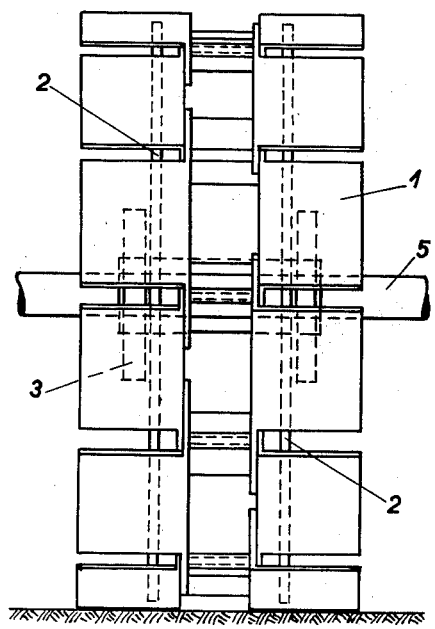
Fig. 2 shows the same in front elevation, on a larger scale.

The chain 1 is laid around two guide wheels 2 which are retained by a spacing member 3 at such a distance apart that the chain is kept correctly tensioned. The spacing member 3 is mounted at 4 on the axle 5 of the vehicle on which the endless track drive is intended to replace an ordinary wheel. The connection between the guide wheels 2 and the spacing member 3 is effected by means of devices 6 of a known type which permit of the adjustment of the clearance between the two guide wheels 2 within the limits required for the tensioning of the chain (Figs. 1 and 2).

Figure 3:
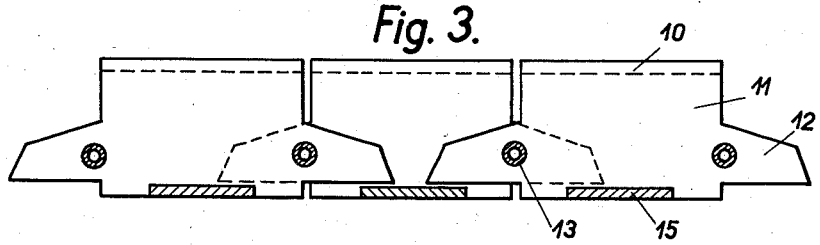
Fig. 3 shows a portion of the endless track chain, comprising three elements or links, in section taken on the line III—III of Fig. 4.
Figure 4:
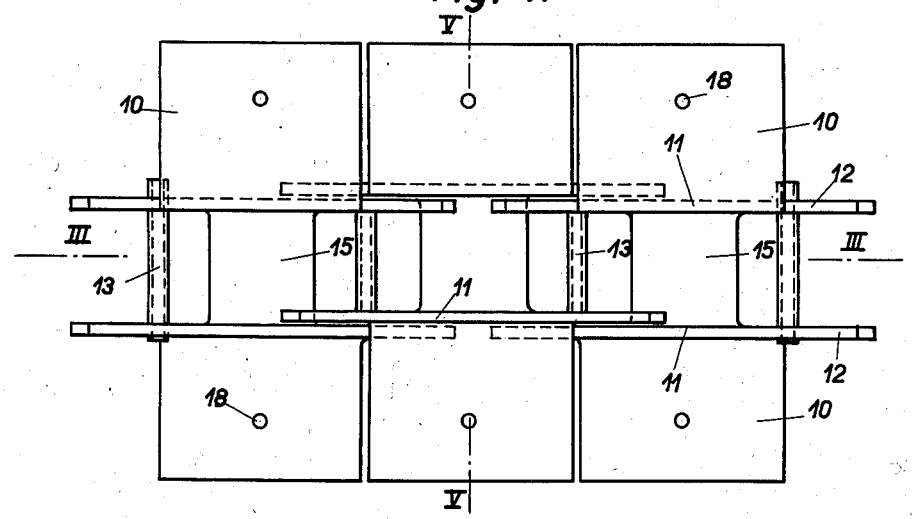
Fig. 4 is an outer plan view of a portion of the upper stretch of endless track shown in Fig. 1, as seen looking down from above.
Figure 5:
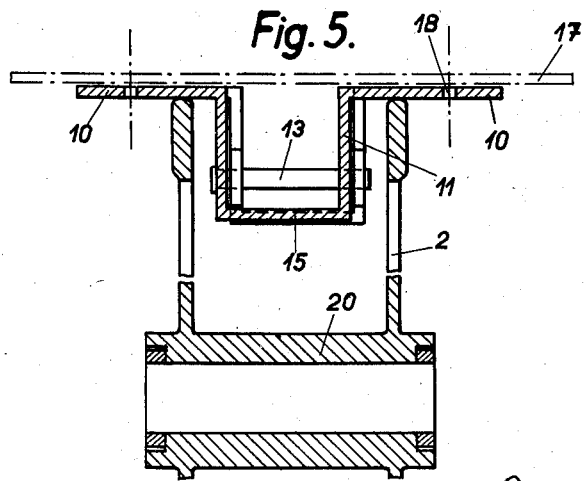
Fig. 5 is a section taken on the line V—V of Fig. 4.

The construction of the elements or links of the chain is shown in Figs. 3 to 5. Each link consists of two outer bearing plates 10 adapted to engage the ground, which merge at their inner side into the articulation plates 11 which are bent at right angles thereto. These latter establish connection between each pair of adjacent chain links, and are so displaced or "staggered" relatively to each other that they overlap each other with their projecting portions 12. The one articulation plate of each chain link lies against the outside and the other against the inside of the articulation plate of the next link, as will be clear from Figs. 4 and 5. A joint pin 13, which may be either solid or hollow, articulately connects together two contiguous chain links, and constitutes the axis common to two opposed points of articulation. The two opposed articulation plates 11 of each chain link are interconnected, finally, by means of a plate 15 which is narrower than the bearing plate, and which adjoins the inner edges of the articulation plates. By "inner edges" is meant the top edges of the plates 11 in the lower stretch of track or the bottom edges in the upper stretch of track as seen in Fig. 1. Each link or member is structurally identical with the others, each being reversed, that is to say turned through 180°, relatively to the next in the series constituting the complete chain or endless track. These members may be steel stampings manufactured in a single working stage.

The guide wheels 2 are each provided with two disks which are fast on a common hub 20, the clearance between these disks being somewhat greater than the over-all distance between the articulation plates, so that there is a slight clearance between the articulation plates and the disks.

In order to increase the carrying power, or for particularly soft or quaggy ground, widening plates 17 (Fig. 5) can be attached in a very simple manner to the bearing plates 10, for which purpose holes 18 are provided in the plates 10.

The described construction possesses the essential advantage that it forms no closed inner space in which matter could collect and impede movement. The space within the plates 10 is for the greater part open towards the outside, since the articulation plates are disposed between the wheel disks; the space between the disks 2 and the articulation plates 11 is too narrow to permit of the collection of matter therein, and is also partly open towards the outside in consequence of the provision of the holes 19 in the disks; the space between the connecting plates 15 and the hub of the wheel is likewise negligible, since any matter lodging between the plates 15 drops out of its own accord.

In contra-distinction to known types of endless track drive, the present invention does away with the necessity for an intermediate supporting wheel. The chain forms a flat surface between the guide wheels over which the pressure is uniformly distributed, and is stiffened in itself, since the projecting portions 12 of the individual articulation plates bear, alternately right and left, against the connecting plates 15 of the next following links, and thus preclude the possibility of inward sagging of the chain.

The entire arrangement is readily accessible in all its parts, and is therefore easy to clean. It will be clear that the endless track according to the invention is equally suitable, in light construction, for small vehicles such as wheelbarrows and the like, and, in heavier types, for larger vehicles as required in agriculture and forestry, in building work, for military purposes, and the like.

I claim:

1. An endless track for vehicles, consisting of links each capable of being made from a single plate-shaped piece of material and the links being directly coupled together by means of knuckle pins, each of the said links comprising on each side a laterally projecting bearing plate adapted to engage the ground, a plate adjoining the said bearing plate extending inwardly at right angles thereto and projecting forwardly and rearwardly lengthwise of the track, bearing eyes in the latter plate, and a middle piece bridging these latter plates at their inner edges.

2. An endless track for vehicles, consisting of identically similar links each capable of being made from a single plate-shaped piece of material, the links being alternately reversed end for end and directly coupled together by means of knuckle pins, each of the said links comprising on each side a laterally projecting bearing plate adapted to engage the ground, a plate adjoining the said bearing plate extending inwardly at right angles thereto and projecting forwardly and rearwardly lengthwise of the track, bearing eyes in the latter plate, and a middle piece bridging these latter plates at their inner edges.

3. An endless track for vehicles, consisting of identically similar links each capable of being made from a single plate-shaped piece of material, the links being alternately reversed end for end and directly coupled together by means of knuckle pins, each of the said links comprising on each side a laterally projecting bearing plate adapted to engage the ground, a plate adjoining the said bearing plate extending inwardly at right angles thereto and projecting forwardly and rearwardly lengthwise of the track, bearing eyes in the said latter plate, and a middle piece bridging these latter plates at their inner edges, the one of the said bearing plates of each link being larger than the other bearing plate of the same link to the extent approximately of the thickness of the said plate having bearing eyes, as measured in a direction parallel to the axis of rotation of the said endless track.

OTTOKAR DRAPAL.